United States Patent [19]
Nakamura et al.

[11] Patent Number: 5,511,414
[45] Date of Patent: Apr. 30, 1996

[54] METHOD OF ANALYSZING GEAR SETS

[75] Inventors: Yasuhiko Nakamura, Higashihiroshima; Kenji Okuda, Iwakuni; Takeo Bando, Hatsukaichi, all of Japan

[73] Assignee: Mazda Motor Corporation, Hiroshima, Japan

[21] Appl. No.: 128,693

[22] Filed: Sep. 30, 1993

[30] Foreign Application Priority Data

Sep. 30, 1992 [JP] Japan .................... 4-286591

[51] Int. Cl.⁶ .................... G01M 13/02; G06F 15/00; G06F 17/50
[52] U.S. Cl. .................... 73/162; 33/501.13; 364/150; 364/474.24; 364/578; 364/512
[58] Field of Search .................... 73/162; 33/501.7, 33/501.8, 501.13; 364/578, 512, 474.24, 150

[56] References Cited

U.S. PATENT DOCUMENTS

| | | | |
|---|---|---|---|
| 4,336,711 | 6/1982 | Maehara et al. | 73/162 |
| 4,831,872 | 5/1989 | Huang et al. | 73/162 |
| 4,872,337 | 10/1989 | Watts et al. | 73/162 |
| 5,016,471 | 5/1991 | Och | 73/162 |
| 5,218,557 | 6/1993 | Simoudis | 364/578 |
| 5,220,512 | 6/1993 | Watkins et al. | 364/578 |
| 5,273,038 | 12/1993 | Beavin | 364/578 |
| 5,297,054 | 3/1994 | Kienzle et al. | 364/474.24 |
| 5,297,057 | 3/1994 | Kramer et al. | 364/512 |

FOREIGN PATENT DOCUMENTS

| | | | |
|---|---|---|---|
| 3-100434 | 4/1991 | Japan . | |
| 404036632 | 2/1992 | Japan | 72/162 |
| 0934285 | 6/1982 | U.S.S.R. | 73/162 |

Primary Examiner—Diego F. F. Gutierrez
Attorney, Agent, or Firm—Keck, Mahin & Cate

[57] ABSTRACT

A gear set analyzing method includes the step of simulating rotation of a gear set having a pair of gears intermeshed with each other. Simulation is based on standard dimensional data for the gear set and curved tooth surface data which consists of data representative of a plurality of points by which each tooth surface of the gears is defined in order to provide data for intermeshing conditions of the gears.

11 Claims, 6 Drawing Sheets

METHOD OF ANALYSZING GEAR SETS

BACKGROUND OF THE INVENTION

1. Field of the Invention

This invention relates to a method of analyzing the intermeshing gears of a gear set and, more particularly, to a method of analyzing intermeshing conditions of gears, based on tooth surface data for gears of a gear set and standard dimensional data of the gear set, by the aid of a three dimensional computer-aided-design (CAD) system.

2. Description of Related Art

In a method of analyzing intermeshing conditions of a gear set which includes a pair of gears intermeshing with each other, one of the two gears, which has painted tooth surfaces, is rotated while the two gears are kept intermeshed. Thereafter, an image of the tooth surfaces of the gear to which paint has been applied is taken and processed in order to enhance exfoliation or separation of the paint from the tooth surfaces. Intermeshing of teeth of these gears is analyzed based on the aspects of separation of paint on the images. Such an analysis method of intermeshing conditions of gear sets is known from, for instance, Japanese Unexamined Patent Publication 3-100434.

A widely utilized intermeshing condition analyzing system, which has been placed on the market by Gleason Corporation, an organization located in the United States of America, performs an analysis of load intermeshing conditions of gears. This analysis is performed through an analysis of intermeshing conditions of gears subjected to load made on the basis of data relating to a cutting tool by means of which the gears have been machined.

With the analysis method described in the above mentioned publication, because processes, such as placement of a gear set in a practical condition, coating paint on one of the gear sets, rotating the intermeshed gears, and image-processing, etc., must be conducted before undertaking an analysis of intermeshing conditions of the gear set, a considerable amount of effort and cost is required for the analysis. Moreover, it is difficult to conduct analytical simulations with variations in parameters during designing and trial manufacturing stages of the gear sets.

However, the Gleason Corporation's system is limited in that it does not lend itself to analysis of gears other than theoretical tooth surfaces defined by a mechanical coordinate system based on the setting conditions of a cutting tool by which the gears are machined and produced. Moreover, analysis of tooth surfaces of intermeshed gears can not be made after heat treatment, lapping or polishing and/or assembling, or during reverse rotation of the gears.

SUMMARY OF THE INVENTION

It is an object of the present invention to provide a method of analyzing intermeshing conditions of gears in a simulated manner by the aid of a three (3) dimensional CAD system.

The above object of the present invention is achieved by providing a method of analyzing intermeshing conditions of a pair of gears intermeshing with each other. Analysis is performed by a three-dimensional computer-aided design (3-D CAM) system on the basis of standard dimensional data for a gear set and tooth surface data which includes data for a plurality of points by which the respective gear is defined. The 3-D CAM system provides data representative of a curved tooth surface for each gear, based on the tooth surface data, and simulates rotation of the gear set with the gears intermeshing with each other based on the standard dimensional data and curved tooth surface data so as to provide intermeshing data for the gears containing, for instance, data representative of intermeshing transitional error and data representative of gear bearing region. This intermeshing data is exhibited on a display, such as a CRT display, or otherwise printed out as a hard copy, or recorded on a floppy disc or a magnetic tape.

The standard dimensional data for a gear set, which is essential to the analysis of intermeshing of gears, includes standard dimensions relating to intermeshing of the gear set, and standard dimensions relating to relative positions of a pair of gears of the gear set.

Gear tooth surface data includes data representative of a number of points by which a tooth surface is defined and may be data obtained from an actual gear surface measured by means of three dimensional measurement equipment. Otherwise, the data may be calculated from a theoretical tooth surface. When using three dimensional measurement equipment, measurements can be made of the gear tooth surface following gear cutting and machining, following heat treatment, or after lapping treatment. In other words, analysis can be made of the gear at any stage of various processes, as desired.

Moreover, if utilization is made of data which is calculated from a theoretical tooth surface of a gear, there is no need for the gear to be actually machined and produced, and analysis can be made of the gear even during the design stage.

With a three dimensional CAD system, a curved surface of the tooth surface of each gear is obtained from the tooth surface data, which, along with the standard dimensional data, facilitates the accomplishment of a simulated rotation for a set of gears in their intermeshing condition, providing information relative to the intermeshing condition of the gear set. In this instance, since a set of gears is simulated in three dimensions in a common coordinate system on the basis of the standard dimensional data and the curved tooth surface data the respective gears by the aid of a three dimensional CAD device, the gears can be rotated in minute increments of angles in their intermeshed state to calculate intermeshing transitional errors, a rotated angle of tooth bearing per pitch, a contact region (tooth bearing region) of the tooth surfaces, etc., and provide information relating to these factors. During the simulation of a gear set, the gears are not necessarily limited to the entire part of the gear set, but may refer to only parts of intermeshing teeth of the gear set.

The information relative to intermeshing of the gear set may be output to various media, such as printers, magnetic recorders, and CRT displays.

According to the intermeshing condition analysis method of the present invention, information relating to intermeshing of a gear set is obtained by means of simulation through a three dimensional CAD system, with the same degree of accuracy as would be expected when direct analysis is made of an actual gear set. Furthermore, the analysis method is conveniently applied to a gear set in the design stage, in the trial manufacturing stage, or during the actual production stage; similarly, the analysis method is applied to gear sets following a gear cutting and machining process, a heating process, and/or after a polishing process.

The tooth surface data is previously obtained through measurements made with three dimensional measurement equipment so that, through the utilization of tooth surface data for an actual gear set, an analysis is made of the actual gear set.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENT

The following description will be directed to a method of analyzing intermeshing of gears applied by example to a gear set including a gear and a pinion for an automobile differential.

Figure 1:
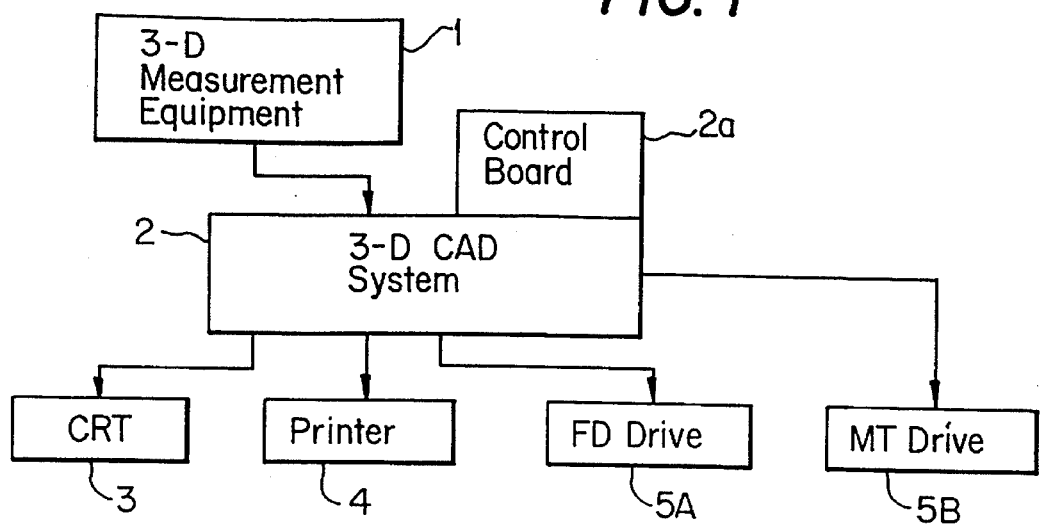
FIG. 1 is a block diagram showing the entire configuration of equipment for analyzing intermeshing of a gear set in an intermeshing condition analysis method in accordance with a preferred embodiment of the present invention.

In summarizing a device for embodying a method of analyzing intermeshing of a gear set, i.e. a pinion and gear, with reference to FIG. 1, a three dimensional measurement equipment 1 takes measurements of a tooth surface (contact surface) of the pinion and a tooth surface (contact surface) of the gear and provides tooth surface data. Tooth surface data representative of the pinion and gear thus obtained is sent to a three dimensional computer-aided-design (which is hereafter referred to simply as a 3-D CAD) device or system 2 and stored therein. The 3-D CAD device 2 stores an analysis program for operational data processing and simulation analysis of intermeshing of the pinion and gear which will be described later in conjunction with FIG. 5. The 3-D CAD system 2 is accompanied by, in addition to its own control and operation board 2a, a CRT display 3, a printer 4, a floppy disk (FD) drive 5A and a magnetic tape (MT) drive 5B, all of which are used to output information relating to intermeshing of the pinion and gear resulting from the analysis.

Figure 2:
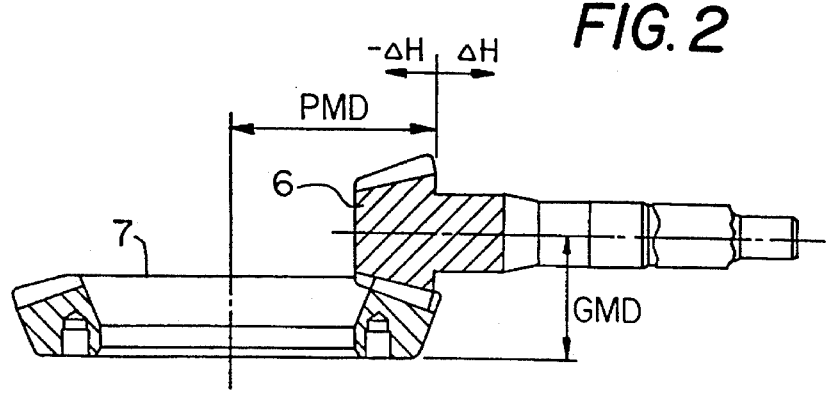
FIG. 2 is a cross-sectional view of a gear set.
Figure 3:
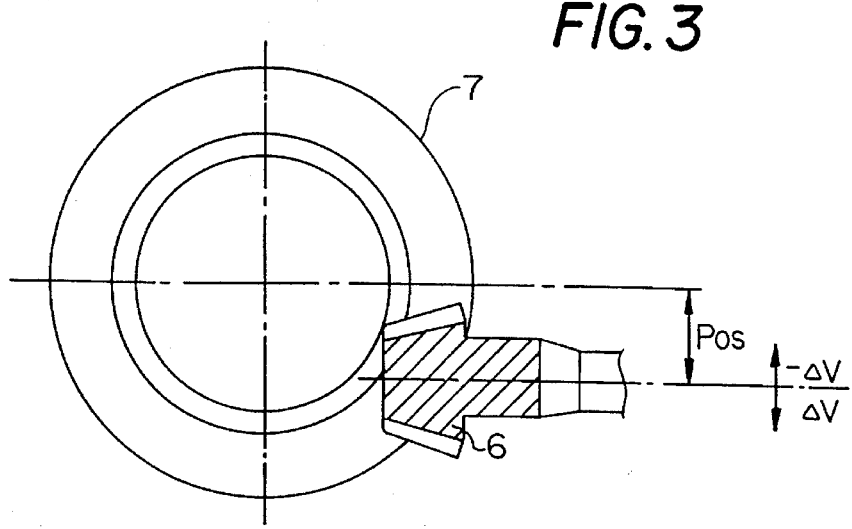
FIG. 3 is a plan view of the gear set.

Referring to FIGS. 2 and 3, in which the pinion 6 and gear 7 are combined as a gear set in the same positional relationship as those for practical use, each of the pinion 6 and the gear 7 has a plurality of hypoid-type teeth. Denoted by reference symbols PMD, $\Delta H$, GMD, Pos and $\Delta V$ are a standard pinion mounting distance of the pinion 6, a mounting distance error (an error with respect to the standard pinion mounting distance PMD), a standard gear mounting distance, a standard pinion offset, and an offset error (an error with respect to the standard pinion offset Pos), respectively.

Figure 4:
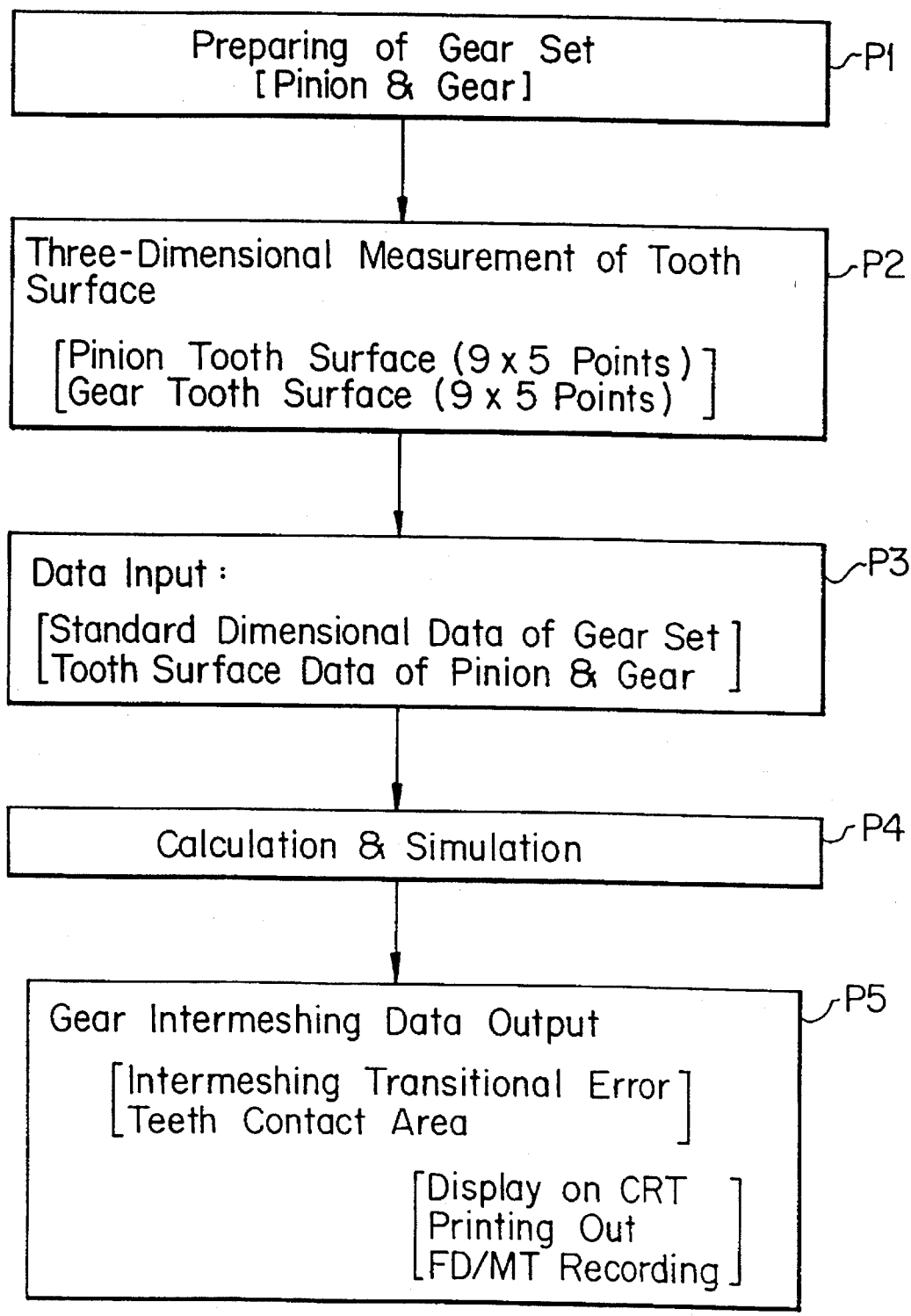
FIG. 4 is a functional process diagram of manufacturing and analyzing of gear sets.
Figure 5:
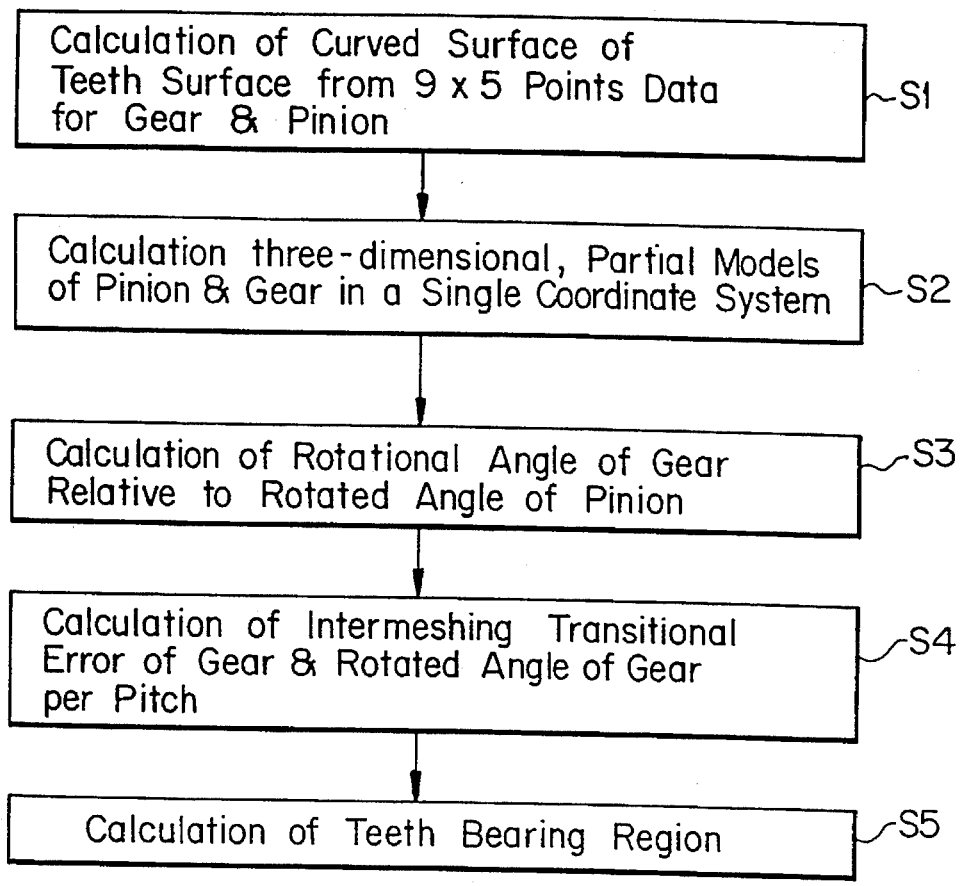
FIG. 5 is a flow chart illustrating data operations and simulation of a gear set.

The method of analyzing intermeshing between the pinion and gear will be understood by reviewing FIGS. 4 and 5.

FIG. 4 diagrammatically and schematically shows a flow chart representing the gear set intermeshing analysis. In the functional process shown in block P1, the pinion 6 and gear 7 for the gear set to be used in an automobile differential are manufactured by utilizing ordinary gear cutting and machining devices, etc. In this instance, the pinion 6 and gear 7 are manufactured by cutting and machining, heat treatment, lapping, etc. Although the gear set intermeshing analysis may be conducted following cutting and machining, following heat treatment, or following lapping, the analysis, in this example, is conducted and performed following cutting and machining.

Thereafter, in the process or function shown block P2, any one of the teeth of the pinion 6 is measured at a total of 45 points over its almost entire surface to provide three dimensional geometric data, or tooth surface data, for the pinion 6. In the same manner, any one of the teeth of the gear 7 is measured at a total of 45 points over almost its entire surface to provide three dimensional geometric data, or tooth surface data, for the gear 7. The 45 measurement points are uniformly distributed in 9 lines in the direction of tooth trace and in 5 lines in the direction of tooth depth. In this instance, the three-dimensional geometric data may be provided as an average of measurements of 9×5 points of a plurality, or otherwise all, of the teeth for each of the pinion 6 and the gear 7.

Subsequently, in the process or function shown in block P3, the 9×5 point three-dimensional geometric data for tooth surfaces of the pinion 6 and gear 7 are input into the 3-D CAD system 2 along with the gear standard dimensional data for the pinion 6 and gear 7. The standard dimensional data contains the number of teeth of each of the pinion 6 and gear 7, a tooth face width for each of the pinion 6 and gear 7, a pinion offset (Pos), pressure angles on concave and convex sides of the pinion 6, limit pressure angles of the pinion 6, a pitch diameter of the gear 7, addendum and deddendum of the gear 7, a pinion mounting distance (PMD), a gear mounting distance (GMD), a pitch angle of the gear 7, a face angle of the gear 7, root angles of the pinion 6 and gear 7, average spiral angles of the pinion 6 and gear 7, and mounting distance errors ($\Delta V$, $\Delta H$ and $\Delta \alpha$). Here, represented by $\Delta \alpha$ is a square crossing error of the pinion shaft.

Subsequently, in the function or process represented by block P4, with the utilization of the standard dimensional data for the gear and the measured tooth surface data, the 3-D CAD system 2 performs various data processing or operations and simulations in which the pinion 6 and gear 7, in mesh with each other, are rotated. The data processing and simulations, which take place in process P4, will be described in detail with reference to a flow chart shown in FIG. 5.

Referring to FIG. 5, first of all, in step S1, with respect to the respective pinion 6 and gear 7, a curved tooth surface is calculated from the 9×5 point three dimensional geometric data for each of the pinion 6 and gear 7. Various methods may be available for the calculation of curved surface of tooth. In this embodiment, a method is used which obtains what is called "NURBS," i.e., a plurality of free curved surfaces which are explained by a set of non-linear rationalized B-splines, on the basis of the tooth surface data. By connecting these free curved surfaces, one three-dimensional curved surface is calculated and determined to be a curved tooth surface of the pinion 6 or the gear 7. Data representative of the curved tooth surfaces of the pinion 6 and gear 7 is stored in the 3-D CAD system 2.

Figure 6:
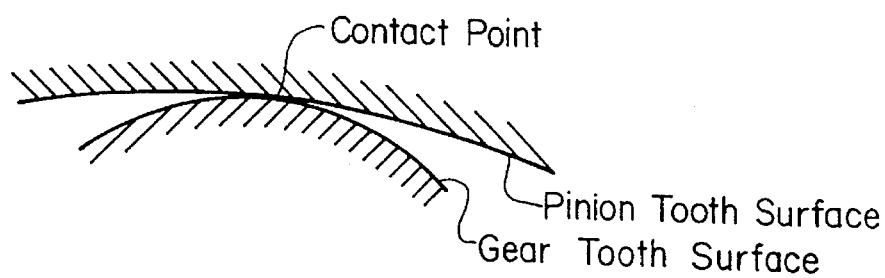
FIG. 6 is a cross-sectional view showing an elemental part of a gear set whose tooth faces are in contact with each other.

Subsequent to the calculation of the respective curved tooth surfaces of the pinion 6 and gear 7 in step S1, on the basis of the standard dimensional data of the gear set and the calculated curved tooth surface data of the pinion 6 and gear 7, a threedimensional partial model of the pinion 6 and a three-dimensional partial model of the gear 7 in mesh with the pinion 6 is calculated in the same coordinate system in step S2. Thereafter, in step S3, a simulation is conducted in which the partial models of the pinion 6 and gear 7 are rotated in their intermeshing state so as to repetitively make a number of calculations of a rotated angle of the gear 7 relative to a rotating angle of the pinion 6. In this instance, with regard to the tooth surface of the pinion 6 having been rotated by a slight angle, the pinion 6 is rotated stepwise by slight angles of, for instance, 0.0001 degrees, so as to gradually bring the tooth surface of the gear 7 into close contact with the tooth surface of the pinion 6. The rotated angle of the gear 7, when both tooth surfaces contact each other, is calculated. A number of these calculations are performed repetitively. FIG. 6 shows the state in which the tooth surface of the gear 7 has been brought into contact with the tooth surface of the pinion 6. It is to be noted that, in step S3, even if the pinion 6 and gear 7 are rotated in reverse directions, accurate gear intermeshing information on reverse rotation is obtained.

Thereafter, in step S4, on the basis of data representative of a number of groups of the rotated angles of the pinion 6 and the corresponding rotated angles of the gear 7 collected in step S3, the intermeshing transitional error E of the gear 7 is calculated for the data of each group from the following equation:

$$E = \theta_g - (N_p/N_g) \times \theta_p$$

where

Np is the number of teeth of the pinion 6;

Ng is the number of teeth of the gear 7;

θp is the rotated angle of the pinion 6; and

θg is the rotated angle of the gear 7.

Figure 7:
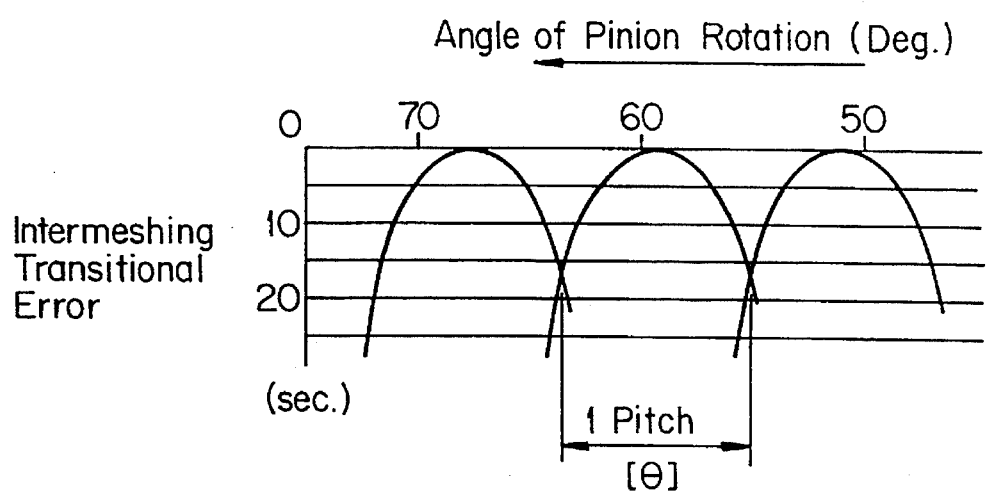
FIG. 7 is a diagram of an example of characteristic curves of intermeshing transitional error of a gear set.

Referring to FIG. 7, characteristic curves, i.e. motion curves, of the transitional error of the gear 7 relative to the pinion 6 are shown. The characteristic curves are drawn by plotting the rotated angles of the gear 7 with respect to the corresponding transitional errors E based on the data representative of a number of groups. In step S4, from the motion curves, the rotated angle θ of the gear 7 per pitch (which corresponds to a single tooth of the gear 7) shown in FIG. 7 is calculated.

Figure 8:
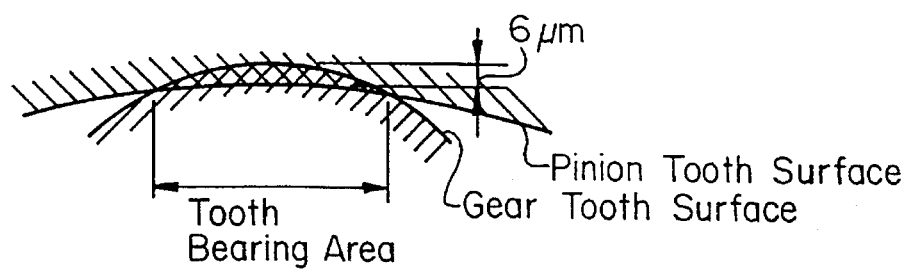
FIG. 8 is a cross-sectional view of an essential part of the gear set showing a state where a gear tooth intersects a teeth surface of a pinion.

Subsequently, in step S5, a tooth bearing region per pitch, i.e., per tooth surface of a single tooth of the gear 7, is calculated. In this instance, calculated as the tooth bearing region of the gear 7 is a region of a tooth surface of the gear 7 intersecting the tooth surface of the pinion 6 in the state, as shown in FIG. 8, in which the gear 7 is rotated until its tooth surface digs into the tooth surface of the pinion 6 held immovable to the depth of approximately 6 μm after the tooth surfaces of the pinion 6 and gear 7 have been brought into contact with each other. In this instance, this depth of 6 μm of surface dig corresponds to the thickness of a minium, or red lead, layer applied to the tooth surface of the pinion 6 for the purpose of gear teeth intermeshing analysis based on exfoliation or separation of the minium layer in a manner well known to those skilled in the art.

When the calculation and simulation have been accomplished with the 3-D CAD system 2 in process P4, the process proceeds on to the function or process represented in block P5. The function carried out in block P5 is to display the information of gear intermeshing, i.e., transitional error E and tooth bearing region, provided from the 3-D CAD system 2 on the CRT display 3. Otherwise, the information relating to transitional error E and tooth bearing region may be printed out by the printer 4 and/or recorded on a floppy disk (FD) by the floppy disk drive 5A or to a magnetic tape (MT) by the magnetic tape drive 5B, as needed.

Figure 9:
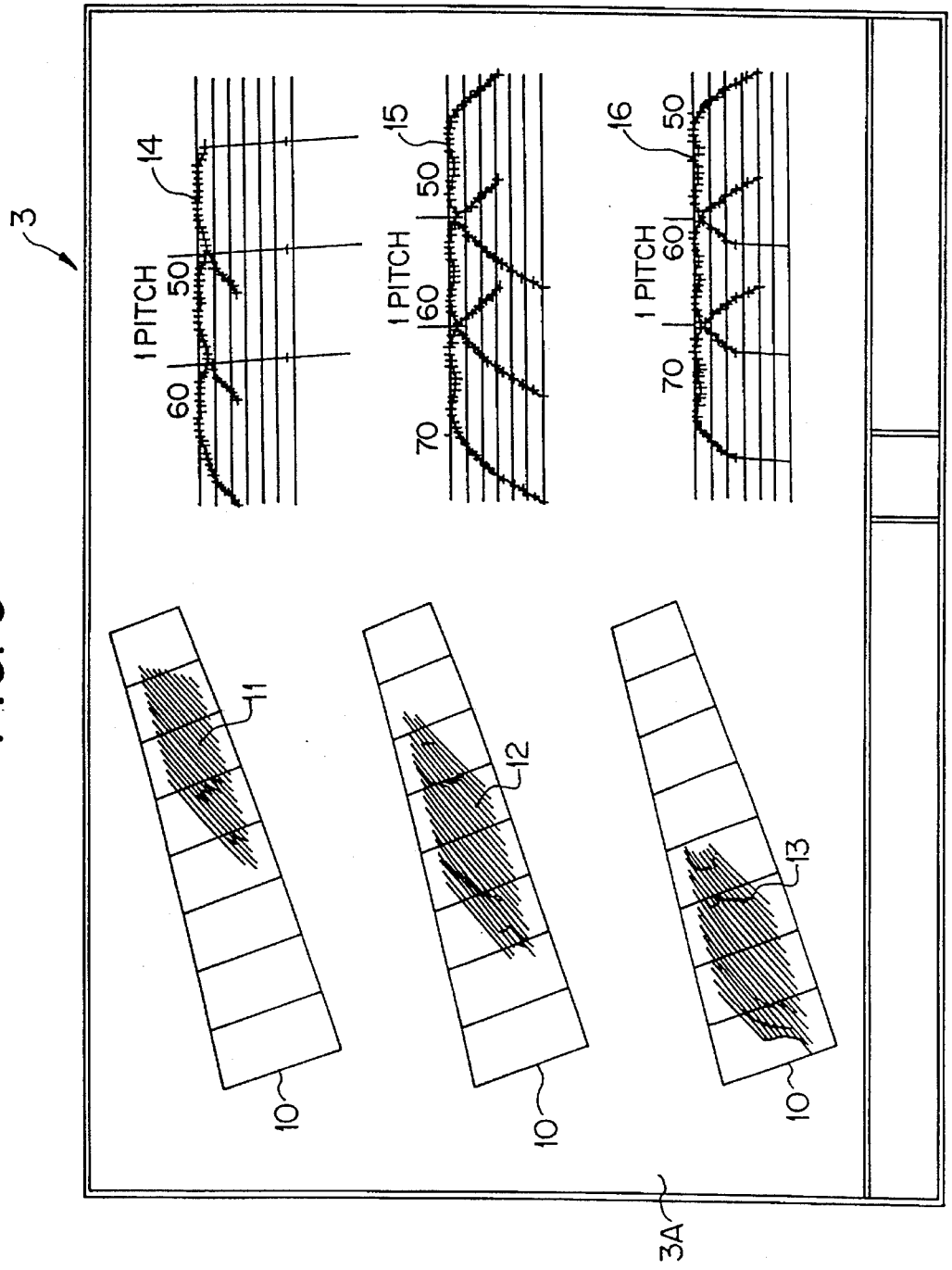
FIG. 9 is an illustration of a display demonstrating gear intermeshing information.
Figure 10:
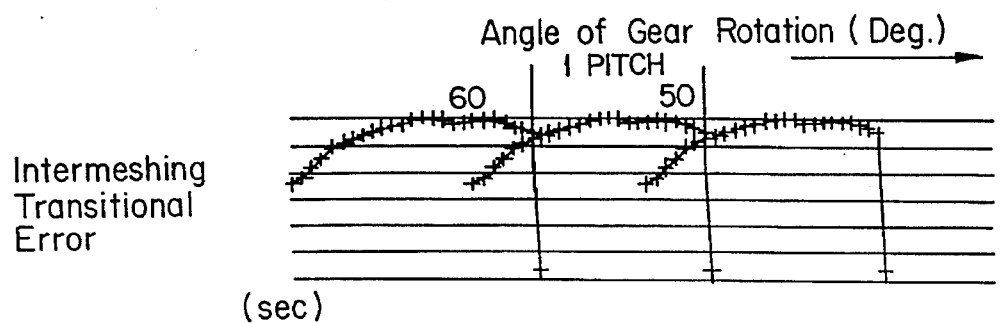
FIGS. 10, 11 and 12 are diagrams showing motion curves of toe, mean and heel sides or sections of a gear teeth.
Figure 11:
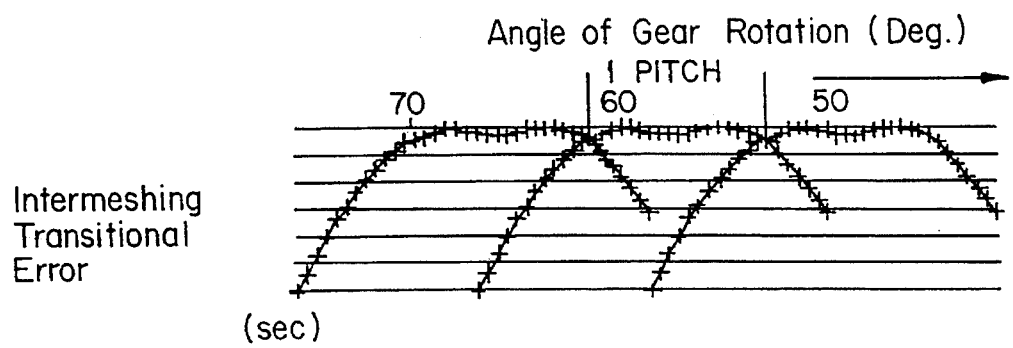
Figure 12:
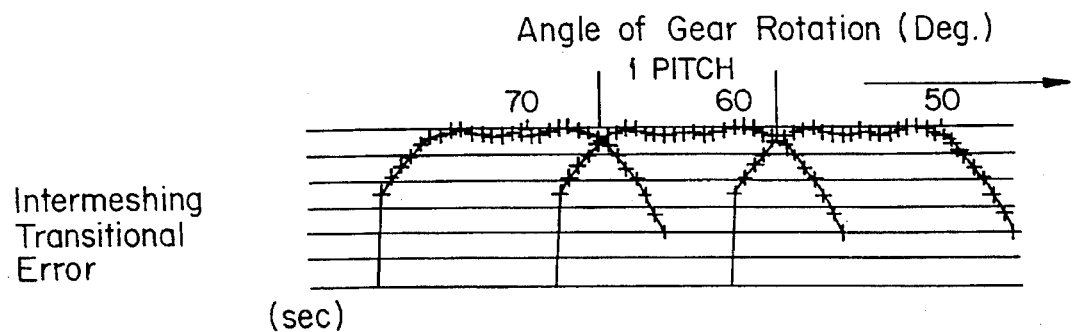

FIG. 9 illustrates, by example, images displayed on a screen 3A of the CRT display 3. Displayed on the screen 3A are images of tooth surface regions 10 of the teeth of the gear 7 and tooth bearing regions 11, 12 and 13 of toe side, means and heel side tooth surfaces of the gear 7, respectively, and motion curves 14, 15 and 16 of the toe side, means and heel side tooth surfaces of the gear 7, respectively. The motion curves 14, 15 and 16 of the toe side, means and heel side tooth surfaces of the gear 7 are shown in an enlarged scale in FIGS. 10, 11 and 12, respectively.

According to the gear intermeshing analysis method described above, the tooth surface data for the pinion 6 and gear 7 measured by the 3-D measurement equipment 1, in addition to the standard dimensional data, is input into the 3-D CAD system 2 so as to display partial models of the pinion 6 and gear 7 in the same coordinate system and demonstrate simulated rotation of the intermeshed pinion 6 and gear 7 on the 3-D CAD system 2, thereby obtaining intermeshing information without any actual rotation of the intermeshed pinion 6 and gear 7. Furthermore, in the gear set design stage, analysis of gear intermeshing conditions can be accomplished on the basis of tooth surface data obtained from theoretical tooth surfaces of a gear set and its standard dimensional data. In addition, in the trial manufacturing stage and the mass-production stage, not only can measurements be made of gear sets after machining, but measurements can also be made of gear sets after heating treatment and after lapping treatment. Consequently, the analysis of gear intermeshing conditions can be conducted for gear sets in any stage of various processes with practical application of gear surface data obtained in this stage.

Since measurement error of the 3-D measurement equipment 1 is on the order of approximately 1 μm and the calculation error of curved tooth surface of the gear in step S1 is on the order of approximately 0.4 μm, an extremely precise analysis can be performed for gear sets. In this instance, since the calculation made based on theoretical curved tooth surface data in step S1 is on the order of approximately 0.1 μm, the analysis is accomplished more precisely.

The calculations made in steps S2–S5 are a feasible technology made practical through the application of a relatively simple program in an ordinary 3-D CAD system and is self evident to those skilled in the art.

Furthermore, the analytical method for gear sets according to the present invention is not limited to a gear set comprised of a pinion 6 and gear 7, but is also applicable to various types of gear sets comprised of intermeshed gears.

It is to be understood that although the present invention has been described with respect to a preferred embodiment thereof, various other embodiments and variants may occur to those skilled in the art. Any such other embodiments and variants which fall within the scope and spirit of the invention are intended to be covered by the following claims.

What is claimed is:

1. A gear set analyzing method comprising the steps of:

providing a gear set having a first gear and a second gear, each gear having a number of gear teeth;

measuring any of the gear teeth of the first gear to provide measured tooth surface data for said first gear;

measuring any of the gear teeth of the second gear to provide measured tooth surface data for said second gear;

determining curved first gear tooth surface data, representative of a curved first gear tooth surface, from said measured tooth surface data for said first gear;

determining curved second gear tooth surface data, representative of a curved second gear tooth surface, from said measured tooth surface data for said second gear;

generating a model of the first gear from said curved first gear tooth surface data and standard dimensional data of the gear set;

generating a model of the second gear from said curved second gear tooth surface data and the standard dimensional data of the gear set;

simulating rotation of said model of the first gear and of said model of the second gear in an intermeshing state;

determining a first contact angle through which said second gear rotates and a second contact angle through which said first gear rotates when said first gear tooth surface and said second gear tooth surface contact each other;

calculating an intermeshing transitional error from the first contact angle, the second contact angle, the number of gear teeth of said first gear and the number of gear teeth of said second gear;

determining tooth bearing regions of the gear teeth; and outputting information relating to said intermeshing transitional error and said tooth bearing regions.

2. A gear set analyzing method according to claim 1, wherein said step of outputting includes the step of displaying said information on a CRT display.

3. A gear set analyzing method according to claim 1, wherein said step of outputting includes the step of printing out said information.

4. A gear set analyzing method according to claim 1, wherein said step of outputting includes the step of recording said information.

5. A gear set analyzing method according to claim 1, wherein said model of the first gear is a three-dimensional partial model.

6. A gear set analyzing method according to claim 1, wherein said model of the second gear is a three-dimensional partial model.

7. A gear set analyzing method according to claim 1, wherein said step of determining tooth bearing regions of the gear teeth includes the step of determining a per pitch tooth bearing region of a gear tooth.

8. A gear set analyzing method according to claim 1, wherein said step of measuring any of the gear teeth of the first gear comprises the step of recording measurement points distributed over substantially an entire surface of one of the gear teeth of the first gear.

9. A gear set analyzing method according to claim 8, wherein said step of measuring any of the gear teeth of the second gear comprises the step of recording measurement points distributed over substantially an entire surface of one of the gear teeth of the second gear.

10. A gear set analyzing method according to claim 9, wherein said measurement points are uniformly distributed in 9 lines in a tooth trace direction and 5 lines in a tooth depth direction.

11. A gear set analyzing method according to claim 1, wherein said intermeshing transitional error is calculated from an equation of the form:

$$E = \theta_g - (N_p/N_g) \times \theta_p,$$

wherein E is said intermeshing transitional error, $\theta_g$ is said first contact angle, $N_p$ is the number of gear teeth of said first gear, $N_g$ is the number of gear teeth of said second gear and $\theta_p$ is said second contact angle.

* * * * *